No. 631,548. Patented Aug. 22, 1899.
C. E. SWAN.
CAR WHEEL.
(Application filed Mar. 17, 1899.)
(No Model.)
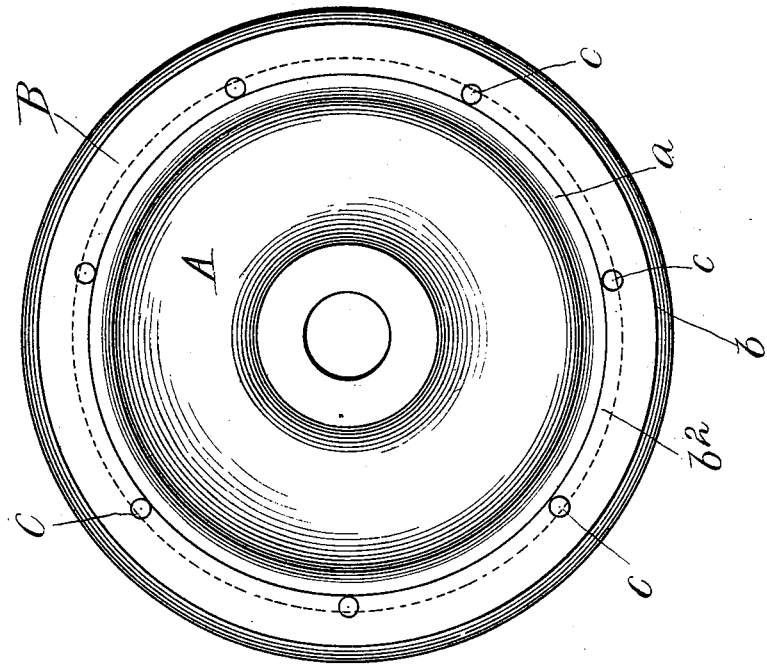
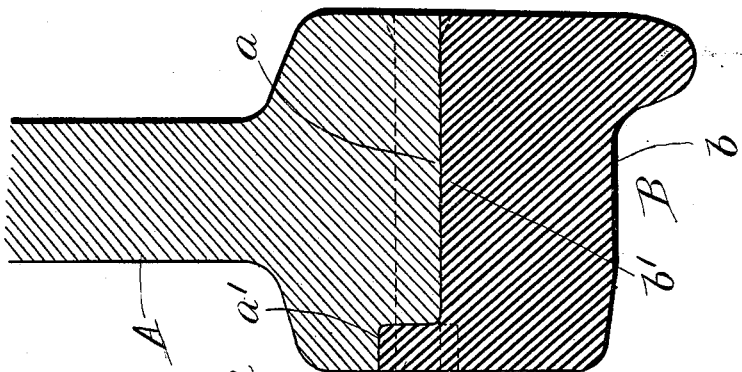
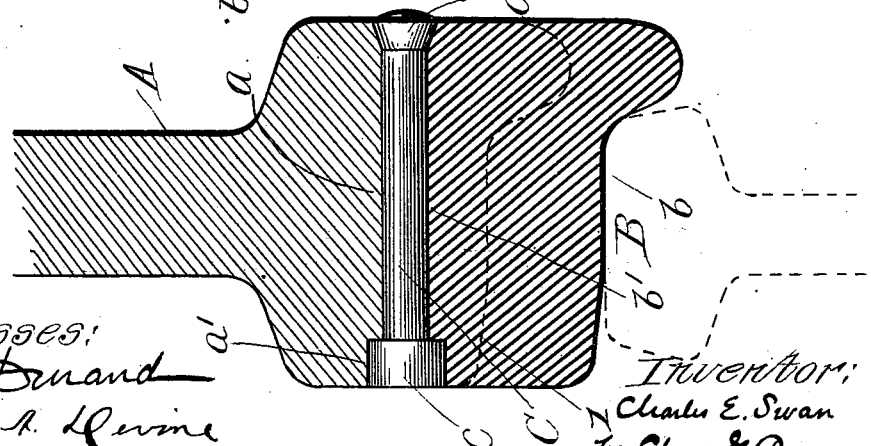
Witnesses:
A. F. Durand
Agnes R. Levine
Inventor:
Charles E. Swan
by Chas L. Page Atty

UNITED STATES PATENT OFFICE.

CHARLES E. SWAN, OF CHICAGO, ILLINOIS.

CAR-WHEEL.

SPECIFICATION forming part of Letters Patent No. 631,548, dated August 22, 1899.

Application filed March 17, 1899. Serial No. 709,542. (No model.)

*To all whom it may concern:*

Be it known that I, CHARLES E. SWAN, a citizen of the United States, residing at Chicago, (Pullman,) in the county of Cook and State of Illinois, have invented a certain new and useful Improvement in Car-Wheels, of which the following is a specification.

Objects of my invention are to provide a strong and simple construction of car-wheel involving a removable steel tire characterized by a maximum life and a minimum of metal; to combine the strength and reliability of a bolted wheel with the simplicity and economy of manufacture peculiar to a boltless wheel; to provide a construction of wheel in which a steel tire is keyed to a rim and in which the tire and rim thus locked against relative shift are substantially of the same width, or, in other words, in which the base of the tire is adequately backed or supported throughout its entire width; to provide a symmetrical car-wheel free from projections and so constructed that when in use no part will tend to work loose as a result of the constant strain and vibration to which the wheel is then subject; to facilitate the operation of removing a worn-out tire and replacing the same with a new one; to provide a removable tire having a base or seating portion free from holes, notches, or grooves which would tend to weaken the tire and make it unsafe; to provide a construction of car-wheel involving a removable steel tire keyed to the rim of a center by keys or bolts which are inside of the juncture-line between the tire and rim or within the periphery of the wheel-center and in which the rim and tire thus held together are substantially of the same width; to provide a center and a tire bolted or keyed thereon in such manner that the vibration will not tend to crack the tire, and to provide certain details and novel features of construction tending to increase the general efficiency and serviceability of steel-tired car-wheels.

To the attainment of the foregoing and other useful ends, my invention consists in matters hereinafter set forth and claimed.

In the accompanying drawings, Figure 1 is a side elevation of a car-wheel constructed in accordance with my invention. Fig. 2 is a transverse section taken through the tire and rim of the wheel shown in Fig. 1. Fig. 3 is a similar section, but illustrating the wheel before the hole is drilled for the bolt shown in Fig. 2.

The invention, as illustrated, comprises a car-wheel center or body portion A, a flanged steel tire B, and a plurality of countersunk bolts C for locking the said tire and body portion against relative shift. Referring to Fig. 3, it will be observed that the tire B is provided with the usual tread $b$ and that its base or seating portion $b'$ is provided at its outer side with an annular web $b^2$.

The car-wheel center or body portion A is provided with a rim $a$ and the latter at its outer side with a peripheral groove or offset $a'$, adapted to receive and form a seat for the web $b^2$—that is to say, the sides of the tire are preferably flush with the sides of the rim.

The rim and tire are preferably of the same width, and while the body portion A may be made of cast or wrought iron the tire B is preferably made of steel and firmly shrunk or otherwise secured upon the rim $a$. After thus securing together the two members of the wheel a plurality of bolt-holes are then drilled through the web and rim, it being preferable to drill the holes as close as possible to the juncture-line between the tire and rim, and each end portion of the bolt-holes thus provided being preferably formed with a countersink, as shown in Figs. 2 and 3. The countersinks at the outer ends of the holes are adapted to receive the heads $c$ of the bolts C, while the countersinks at their inner ends are adapted to permit the upsetting of the inner end portions $c'$ of the bolts, as illustrated in Fig. 2. Preferably the countersinks which receive the heads of the bolts are of a depth to permit the heads to extend entirely through the web $b^2$, though such depth may be varied so as to permit the heads to extend only partially through the web, or, if so desired, entirely through the same and into the metal of the rim. By such arrangement and construction the bolt-heads are made to serve as keys for locking the tire and rim against relative rotation, and the countersinking and upsetting of the bolts render the wheel free from all projections. The web on the tire prevents the latter from being crowded or forced inward and off the rim by the pressure of the rail on the flange, there being practically no lateral strain on the tire in the opposite direction. It will be observed that the relative formation of the tire-base and rim is such that the former is adequately backed or supported by the latter throughout its entire width, and, further, that such support or backing is afforded by metal which is integral with the center or body portion.

In Fig. 2 the dotted line 1 indicates the extent of wear or turning down permissible in steel-tired car-wheels, and from this it will be seen that my construction permits the tire to be worn down to the limit without in any way weakening or endangering the integrity of the wheel, as the arrangement and construction adopted involve neither radial projections upon the periphery of the rim nor grooves on the base or seating portion of the tire. So that while I thus secure a maximum life for the tire with a minimum of metal I also obtain simplicity and strength, and thereby a considerable reduction in the cost of manufacture. Also the construction tends to simplify and facilitate the operation of repairing the wheel, as in so doing the bolts may be readily driven out and the worn-out tire then removed from the rim and replaced with a new one. And, furthermore, by drilling the bolt-holes inside of the juncture-line between the tire and rim—that is to say, by inserting the bolts or keys through the wheel in such manner that the base or seating portion of the tire will be free from grooves or notches—the tire is rendered safe and less liable to crack as a result of the constant vibration. In certain constructions heretofore proposed, however, the keys have been inserted in a way that necessitated grooving or cutting across the base of the tire, and in each instance such method has proven faulty and impracticable, as the vibration tends to "center," so to speak, about the grooves or notches and to invariably crack and break the tire at such points.

As a further advantage of my novel construction it will be seen that while the tire is adequately backed for its full width by the metal of the center the keys are extended through the lap-joint in such manner that should the tire break or crack the fragments will not be thrown from the wheel. It will also be observed that by drilling the bolt-holes through the center at points immediately or just inside of the line of juncture between the tire and center I economize in the use of metal—that is to say, I reduce the depth of the web on the steel tire—and that by countersinking the heads of the bolts entirely through the said web I avoid a "double joint," so to speak, between each bolt and the wheel, or, in other words, that by having the shanks of the bolts extend only through the metal of the center I avoid a construction which would tend to make the bolts work loose. In this way the bolt-heads serve as keys to lock the tire and center against relative rotation, and as the heads are of a diameter to extend slightly beyond the line of juncture between the tire and center they also serve to keep the tire from working outward and off the center.

What I claim as my invention is—

1. A car-wheel comprising a flanged tire provided internally and at its outer side with an annular web; a car-wheel center or body having a rim or seating portion provided peripherally and at its outer side with an annular offset adapted to receive the web on the tire; a plurality of bolts or keys for holding the tire and center together; the said bolts or keys being countersunk at both ends and inserted at points inside of the car-wheel center's periphery; and the outer and inner sides of the tire being flush with the outer and inner sides of the rim or seating portion of the said center.

2. A car-wheel comprising a tire provided internally with an annular web which is flush with the outer side of the tire; a center or body having a rim or seating portion adapted to support the tire throughout its entire width, and provided peripherally and at its outer side with an annular offset adapted to receive the said web on the tire; and a plurality of bolts for holding the tire and center together, the said bolts being inserted at points inside of the line of juncture between the tire and center.

3. A car-wheel comprising a tire and center bolted together with a lap-joint, and in which the shanks of the bolts extend through the center at points immediately inside of the line of juncture between the tire and center, the heads of the said bolts extending through the tire-web at points immediately outside of the line of juncture between the said web and the offset on the center, and the said heads being of a diameter to extend slightly beyond the line of juncture between the tire and center, substantially as and for the purpose set forth.

4. A car-wheel comprising a tire provided internally and at its outer side with an annular web; a center provided peripherally and at its outer side with an annular offset adapted to receive the said web; a plurality of bolts for holding the tire and center together, the bolts being inserted at points inside of the center's periphery, the cylindric heads of the bolts being countersunk in the said web, and their opposite ends being upset; and the tire being supported throughout its width by metal which is integral with the center.

5. A car-wheel comprising a tire provided internally and at its outer side with a web; a center having a peripheral offset formed at its outer side; a plurality of bolts for holding the tire and center together, the bolt-holes being drilled at points immediately inside of the line of juncture between the tire and center, the cylindric heads of the bolts being countersunk in the said web, and their opposite ends being upset; and the outer and inner sides of the tire being flush, or substantially flush, with the sides of the rim or seating portion of the center, substantially as and for the purpose described.

6. A car-wheel comprising a center or body portion provided with a rim having a flat periphery or seating-surface $a$, a steel tire having a base portion adapted to fit and seat upon the said rim, the outer side of the tire-base being provided with an annular web $b^2$, and the outer side of the rim being provided with a peripheral offset $a'$; and suitable bolts for binding the tire upon the said rim, the tire and rim being of the same width for the purpose described.

7. A car-wheel comprising a steel tire having the outer side of its base portion provided with an annular web which is flush with the outer side of the tire, a center or body portion having a rim upon which the said tire is shrunk, the outer side of the said rim being provided with an annular and peripheral offset adapted to receive and form a seat for the said web on the base of the steel tire, and a plurality of bolts extended through the said rim and web at points inside of the juncture-line between the tire and rim; the heads of the said bolts being countersunk in and entirely through the said web, and the opposite ends of the bolts being upset within the holes through which they extend.

8. A car-wheel comprising a flanged tire having the outer side of its base portion provided with an annular web, a center or body portion having the outer side of its rim provided with an annular and peripheral offset adapted to receive and form a seat for the said web on the base of the tire; the tire and the seating portion of the rim being substantially of the same width for the purpose described, and a plurality of bolts being inserted through the said rim and web and having their heads countersunk in the web for the purpose of locking the tire and body portion against relative shift.

CHARLES E. SWAN.

Witnesses:
ARTHUR F. DURAND,
AGNES A. DEVINE.